(12) United States Patent
Jung

(10) Patent No.: US 7,163,288 B1
(45) Date of Patent: Jan. 16, 2007

(54) STRUCTURE FOR FIXING SIDE SHIELD OF GLASSES

(75) Inventor: Sung Mo Jung, Gyeongsangbuk-Do (KR)

(73) Assignee: Frame-Tec Co., Ltd., Daegu (KR)

( * ) Notice: Subject to any disclaimer, the term of this patent is extended or adjusted under 35 U.S.C. 154(b) by 0 days.

(21) Appl. No.: 11/289,397

(22) Filed: Nov. 30, 2005

(30) Foreign Application Priority Data

Oct. 24, 2005 (KR) .................... 20-2005-0030087

(51) Int. Cl.
*G02C 7/10* (2006.01)

(52) U.S. Cl. .................... 351/44; 351/158; 2/448; 2/449

(58) Field of Classification Search ............... 351/44, 351/41, 121, 111, 158; 2/448, 449, 450, 2/12, 13, 451
See application file for complete search history.

(56) References Cited

U.S. PATENT DOCUMENTS 5,548,351 A * 8/1996 Hirschman et al. ........... 351/47

6,540,347 B1 * 4/2003 Radziwon et al. ............ 351/41

* cited by examiner

*Primary Examiner*—Hung Xuan Dang
(74) *Attorney, Agent, or Firm*—Mayer Brown Rowe & Maw LLP

(57) ABSTRACT

A structure for fixing a side shield of glasses is disclosed, in which a glasses side shield can be easily detachably fixed at a glasses leg, and a shied shield can be protected from damages when attaching or detaching the side shield, with the glasses side shields being engaged between the left and right legs of glasses for thereby protecting user's eyes from being damaged by foreign substances which may be inputted between the glasses legs and a glasses body. The structure for fixing a side shield of glasses is characterized in that the fixture has a step portion protruded from a lower side end by a certain length with the fixture being inserted into the through hole of both sides through the opening of the side shield, and a curvature portion is formed at an upper side of the step portion, and the step portion of the fixture is tightly inserted into the through hole of the side shield, and a straight line shaped or cross shaped driver insertion groove is formed at an upper surface of the fixture.

2 Claims, 7 Drawing Sheets

US 7,163,288 B1

STRUCTURE FOR FIXING SIDE SHIELD OF GLASSES

TECHNICAL FIELD

The present invention relates to a structure for fixing a side shield of glasses, and in particular to an improved structure for fixing a side shield of glasses in which a glasses side shield can be easily detachably fixed at a glasses leg, and a shied shield can be protected from damages when attaching or detaching the side shield, with the glasses side shields being engaged between the left and right legs of glasses for thereby protecting user's eyes from being damaged by foreign substances which may be inputted between the glasses legs and a glasses body.

BACKGROUND ART

Generally, when wearing glasses, a gap between a glasses leg and a glasses body is so wide. In addition, there may be many flying foreign substances in the air of a work site, so that the flying foreign substances may be inputted through a gap between the glasses legs and the glasses body. In this case, the foreign substances may damage user's eyes when the foreign substances are inputted into the eyes.

In order to overcome the above problems, a side shield is installed at a portion between a glasses leg and a glasses body, so that the foreign substances are prevented from being inputted into the user's eyes.

As shown in FIG. 6, a conventional side shield includes a fixture 1 which has a through hole 22 formed at the inner upper and lower portions of a rear side of a side shield 2, a pressing member 102 formed in an inner side, and a hook part 101 formed at the upper and lower portions of a front side. The fixture 1 is inserted through an opening 21 of the side shield 2, and the hook part 101 of the fixture 1 is engaged at the through hole 22, and the pressing member 102 of the fixture 1 pressurizes the glasses leg 3.

As shown in FIG. 7, the conventional side shield is formed in a structure which surrounds the glasses frame 4 and the glasses legs 3. In the structure, the glasses leg 3 is first positioned in the side shield 2, and the fixture 1 is inserted into the opening 21 of the side shield 2, so that the hook parts 101 of both sides of the fixture 1 are engaged at the upper and lower through holes 22.

With the above construction, the pressing member 102 provided between the hook parts 101 of both sides of the fixture 1 pressurize the glasses leg 3, so that the side shield 2 and the glass leg 3 are engaged.

In the above-described conventional side shield, it is needed to insert the side shield at the glasses leg, and the fixture is inserted into the side shield, so that the glasses legs are pressurized and fixed. The side shield can be stably engaged between the glasses leg and the glasses frame, and the hook parts of the fixture are inserted into the through holes formed at the side shields, so that it is very easy to assemble and install. In addition, the fixture is embedded based on the size of the side shield, so that a good outer look can be achieved.

However, in the above-described conventional side shield, when installing the side shield between the glasses leg and the glasses frame, it is needed to first install the side shield at the glasses leg, and then the hook parts of both sides of the fixture are fixedly inserted into the through holes of the side shields. In this case, the engagement may be faster performed using an inclination surface formed at each hook part of the fixture, but when disassembling the fixture, it needs too much time, and it is too inconvenient.

Namely, the fixture is fixedly inserted into the opening of the side shield after the glasses leg is positioned in the inside of the side shield. At this time, the hook parts are formed at both sides of the fixture with the hook parts being inserted into the through holes of the side shields.

Therefore, the fixture may be fixedly caught by the through hole in cooperation with the upside down triangle shape of the hook part, so that it is impossible to disassemble the fixture. When the fixture is needed to be disassembled by force, the hook parts of both sides of the fixture or the through holes of the side shield may be damaged.

In the conventional side shield, it is very difficult to disassemble the side shield after it is assembled once, so that too many inconveniences occur. When it is needed to disassemble by force, the hook parts or the through holes may be damaged, so that the cost for repurchasing the products may be additionally needed.

DISCLOSURE OF THE INVENTION

Accordingly, it is an object of the present invention to provide a structure for fixing side shields of glasses, which overcomes the problems encountered in the conventional art.

In order to achieve the above object, in a structure for fixing a side shield of glasses in which a side shield is installed at a glasses leg, a through hole is formed at the inner upper and lower portions of a rear side of the side shield which surrounds the glasses leg, and a fixture is inserted into an opening of the side shield, and the both ends of the fixture are inserted into the through hole of the side shield, and a pressing member provided at a center portion of the fixture pressurizes the glasses leg, there is provided an improved structure for fixing a side shield of glasses characterized in that the fixture has a step portion protruded from a lower side end by a certain length with the fixture being inserted into the through hole of both sides through the opening of the side shield, and a curvature portion is formed at an upper side of the step portion, and the step portion of the fixture is tightly inserted into the through hole of the side shield, and a straight line shaped or cross shaped driver insertion groove is formed at an upper surface of the fixture.

In addition, a protrusion having a certain size is formed at a center portion of a lower side of the fixture, and a groove is formed at the same height portion as the glasses leg so that the protrusion of the fixture is mounted at the groove with the protrusion of the fixture being closely contacted with the glasses leg.

MODES FOR CARRYING OUT THE INVENTION

Figure 1:
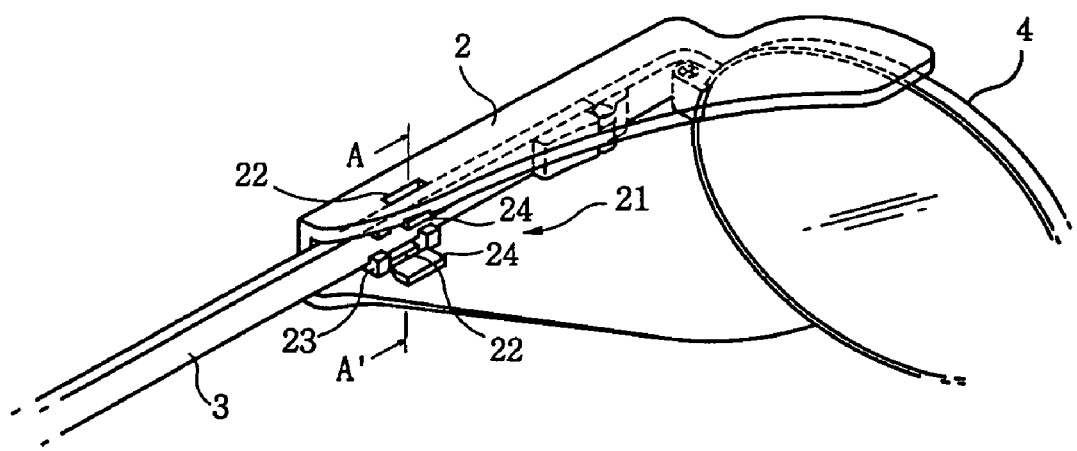
FIG. 1 is a view illustrating a structure that a side shield is fixed at glasses according to the present invention.

The preferred embodiment of the present invention will be described with reference to the accompanying drawings. As shown in FIG. 1, a side shield 2 is formed in a structure which surrounds a connection portion of a glasses frame 4 and a glasses leg 3.

In addition, the structure for fixing a side shield of glasses according to the present invention is designed to install the side shields 2 at the glasses legs 3.

Figure 2:
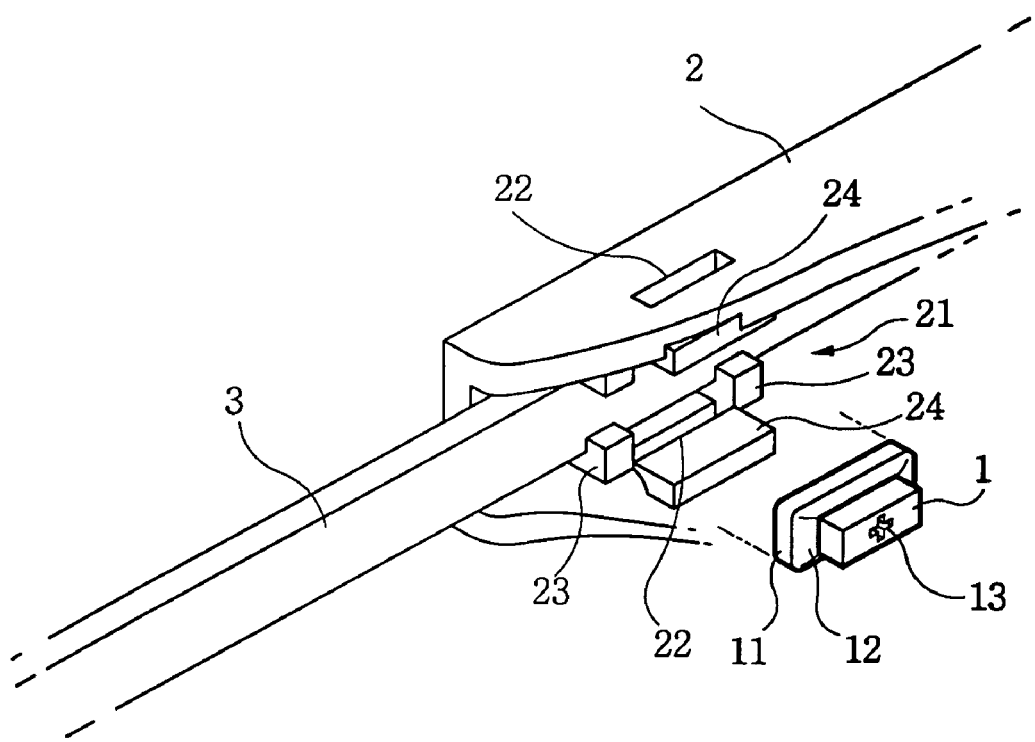
FIG. 2 is a view illustrating a fixed state of a side shield according to the present invention.

As shown in FIG. 2, a through hole 22 is formed at the side shield 2 which surrounds the glasses leg 3. The side shield 2 is closely fixed at the glasses leg 3 using a fixture 1.

A through hole 22 is formed at inner upper and lower portions of a rear side of the side shield 2 which surrounds the glasses leg 3. A step portion 11 is protruded from a lower portion of the fixture 1, and a curvature portion 12 is formed at an upper side of the step portion 11.

The fixture 1 is inserted through the opening 21 of the side shield 2, so that the step portions 11 of both sides of the fixture 1 are selectively inserted into the through holes 22, whereby the lower side of the fixture 1 is pressurized by the curvature portion 12 of the step portion 11 for thereby closely pressing the glasses leg 3.

As shown in FIG. 2, the side shield 2 is formed at the inner upper and power sides, and a guide part 24 is formed at the opening 21 of the side shield 2 with the guide part 24 being designed to guide the fixture 1 into the through hole 22 of the side shield 2.

The guide part 24 is formed at the inner upper and lower sides of the opening 21 of the side shield 2 which surrounds the glasses leg 3, and the through hole 22 is formed at the inner side of the guide part 24.

Figure 3:
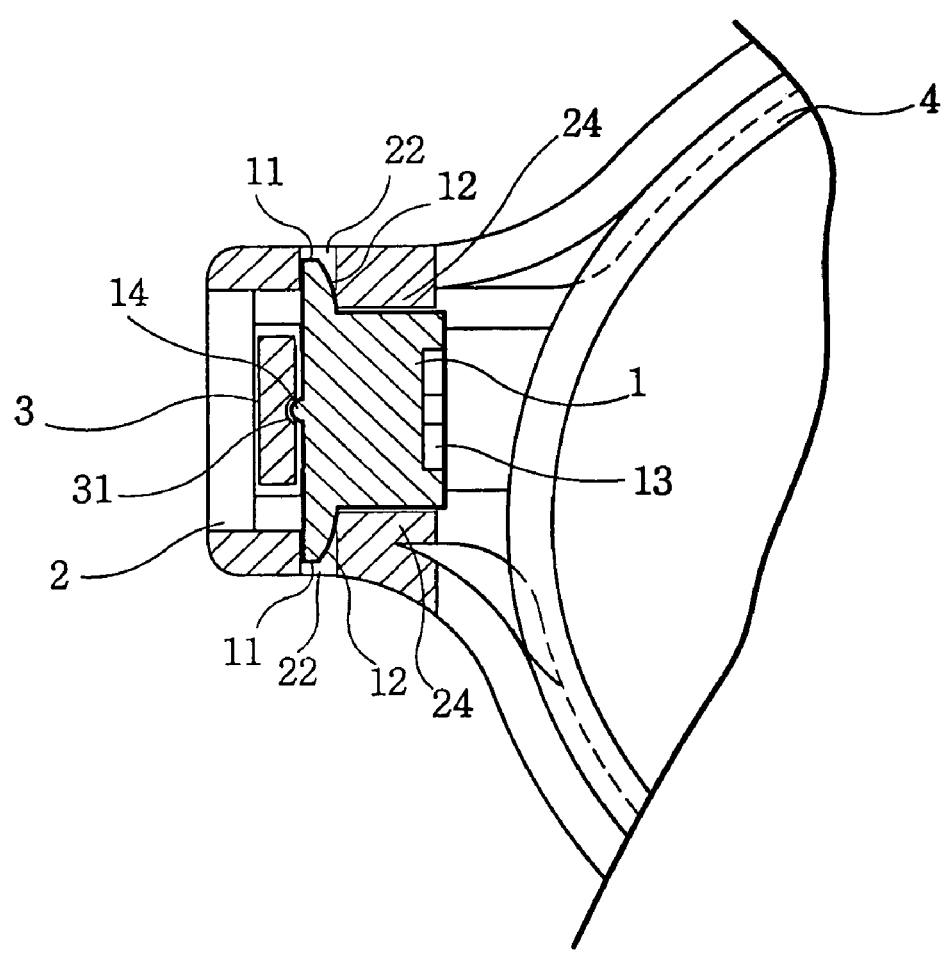
FIG. 3 is a cross sectional view taken along line A–A' according to the present invention.

The installation method of the side shield 2 according to the present invention will be described. The side shield 2 is installed between the glasses frame 4 and the glasses leg 3 by a known method. As shown in FIG. 3, the glasses leg 4 is positioned between a plurality of engaging members 23 formed at the inner side of the side shield 2 and the inner side of the side shield 2.

The fixture 1 is inserted into the portion between the engaging members 23 of the side shield 2, namely, into the guide part 24 formed at the opening 21 of the side shield 2, so that the both sides of the fixture 1 are engaged by the through hole 22 of the side shield 2, and at the same time the glasses leg 3 is pressurized.

Figure 4:
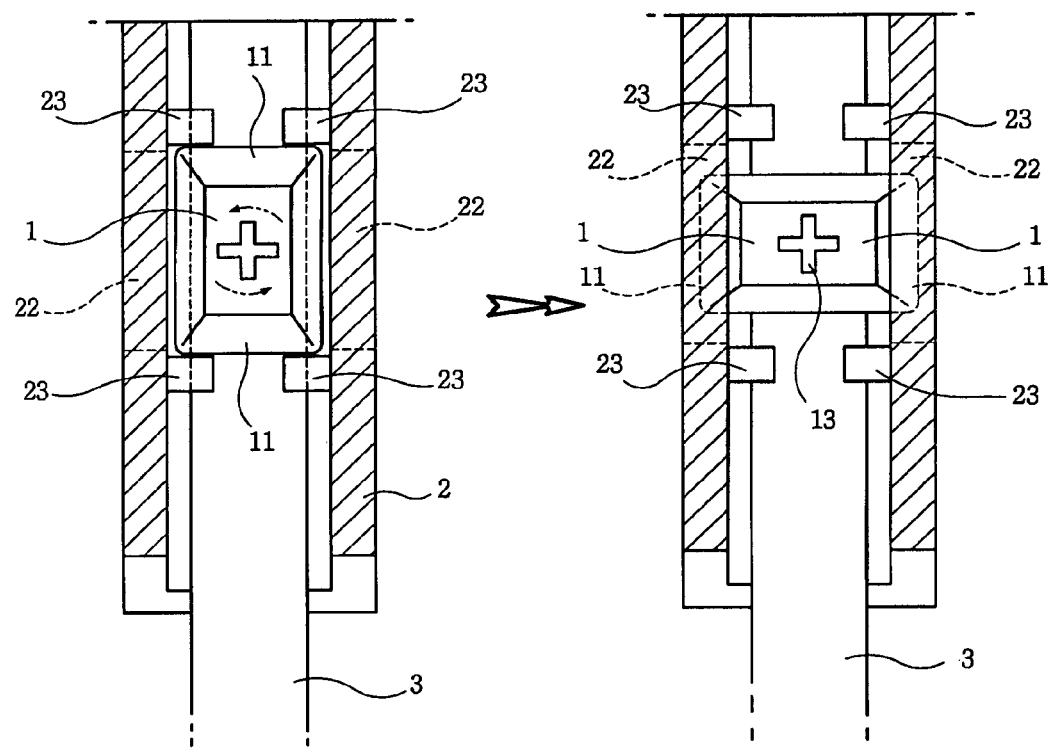
FIG. 4 is a view illustrating an installed state of a fixture that fixes a side shield at a leg of glasses according to the present invention.
Figure 5:
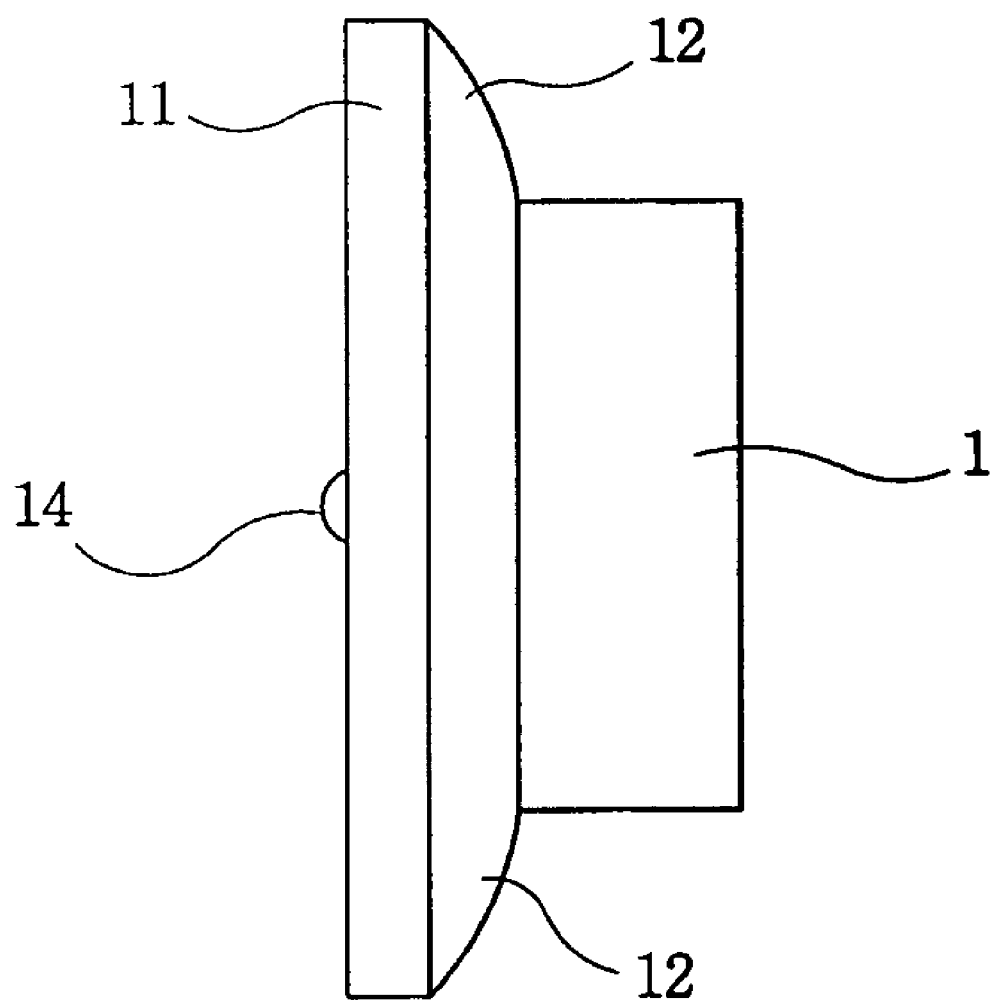
FIG. 5 is a side view illustrating a fixture according to the present invention according to the present invention.
Figure 6:
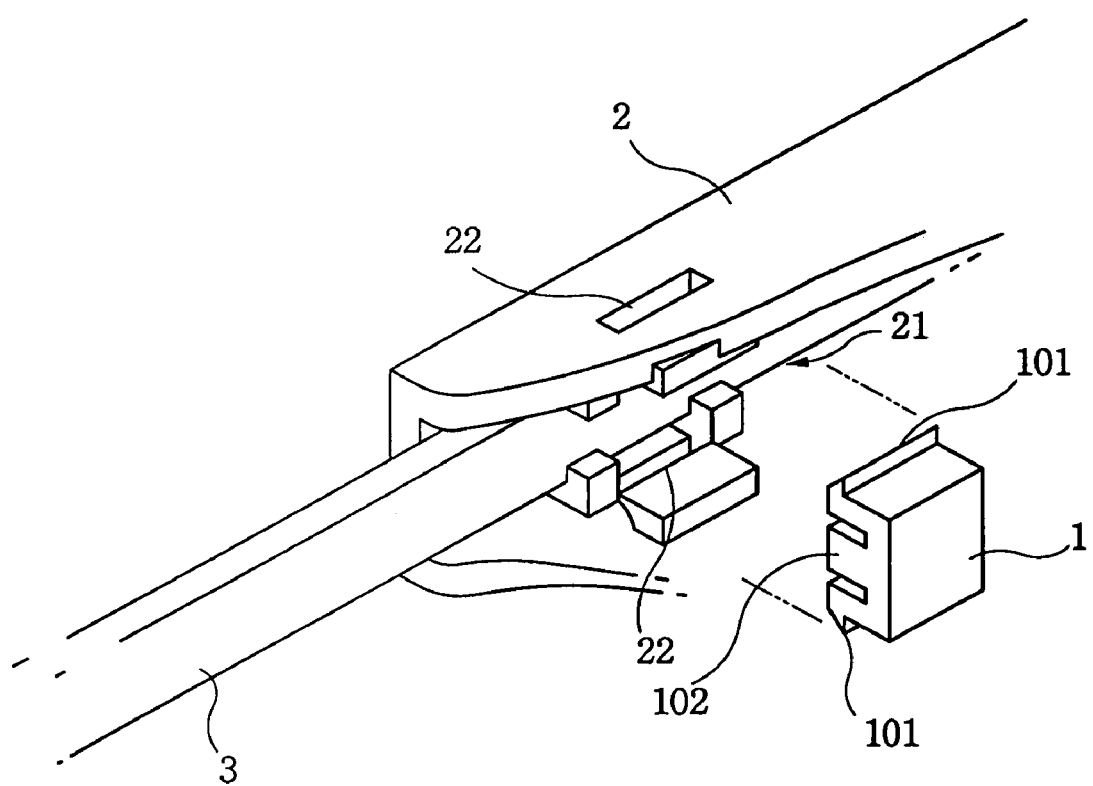
FIG. 6 is a view illustrating an installed state of a conventional side shield of glasses.
Figure 7:
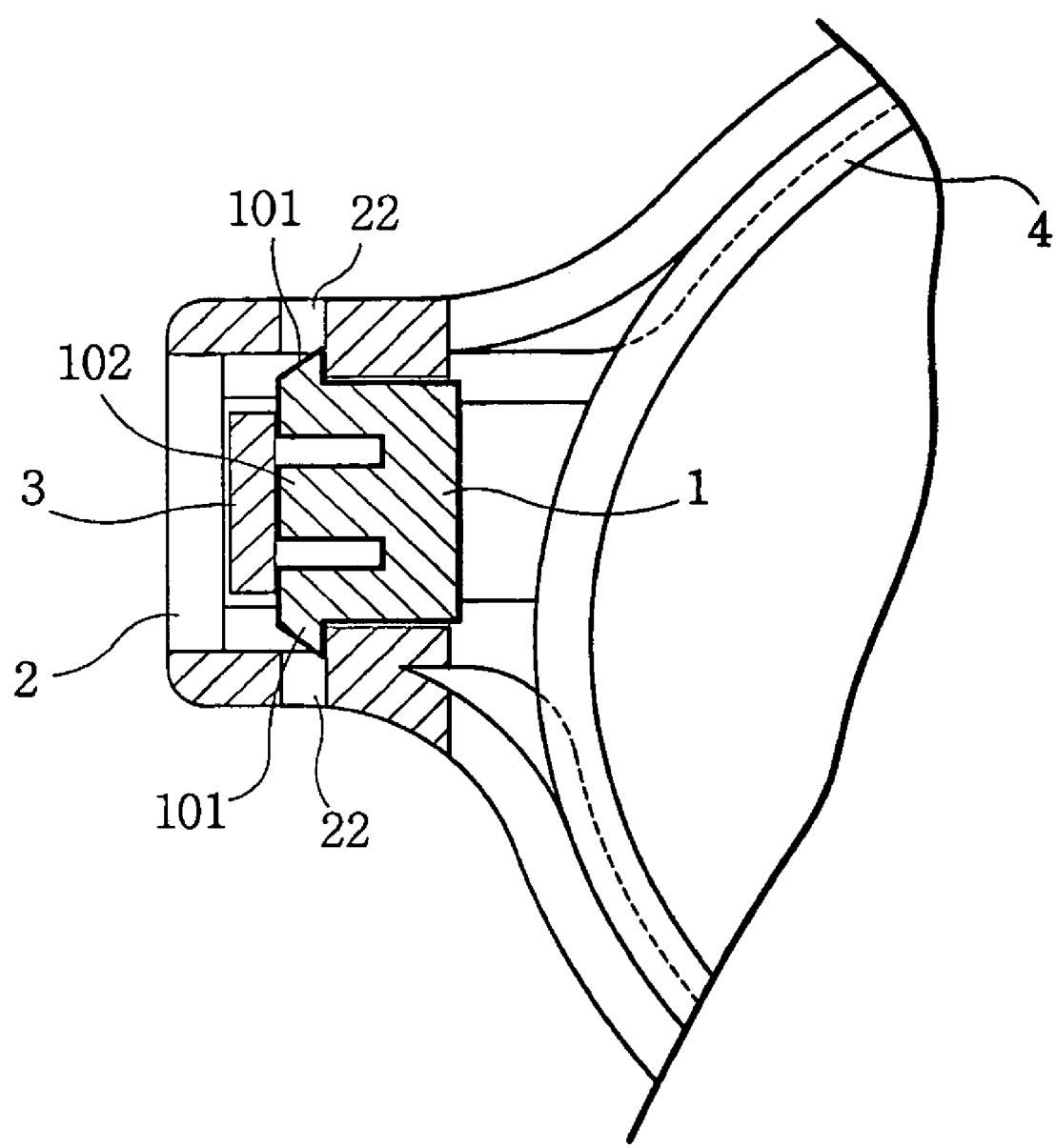
FIG. 7 is a side cross sectional view illustrating an installed state of a conventional side shield.

Since the step 11 formed at the lower end is formed in a rectangular shape, when the fixture 1 is inserted into the opening 21 of the side shield 2, as shown in FIG. 4, the step portion 11 formed at the lower side of the fixture 1 is inserted in the horizontal direction, and the fixture 1 and the step portion 11 are rotated in one direction (vertical direction) using a driver, so that the step portion 11 is inserted into the through hole 22 of the lower side of the opening 21. In this case, the both sides arranged in the horizontal direction of the step portion 11 are fixedly inserted into the through holes 22 of the both sides of the side shield 2 by force, and at the same time, the lower side of the fixture 11 pressurizes the glasses leg 3.

In addition, the step portion 11 formed at the lower side of the fixture 11 is tightly inserted into the through hole 22 of the side shield 2 since the curvature portion 12 is formed at the upper surface with a certain height for thereby achieving a stable fixing state. The lower side of the fixture 1 stably and strongly pressurizes the glasses leg 3.

The fixture 1 has a straight line shaped or cross shaped driver insertion groove 13, so that it is possible to fast attach or detach the fixture 1 using a driver.

A protrusion 14 is formed at the center of the lower side of the fixture 1, and a groove 31 is formed at the same height line as the glasses leg 3, so that the protrusion 14 of the fixture 1 is mounted at the groove 31, with the protrusion 14 of the fixture 1 being closely contacted with the glasses leg 3. With the above construction, when the fixture 1 is inserted into the through hole 11 through the opening 21 of the side shield 2, so that the fixture 1 can be easily rotated in one direction based on a rotation axis, and the protrusion 14 can more stably pressurize the glasses leg 3.

As described above, the curvature portion 12 is formed at an upper side of the step portion 11 of the fixture 1, so that the engaging force is enhanced as the step portion 1 is tightly inserted into the through hole 22 of the side shield 2. The side shield 1 is preferably formed of a plastic mold material such as a synthetic resin, etc. and has a certain elastic force. Even when the step portion 11 having a slightly larger curvature portion 12 as compared to the size of the through hole 22 is inserted by force, any damages can be prevented.

The present invention is basically directed to easily attaching or detaching the side shield to/from the glasses. In the present invention, it is possible to overcome the problems encountered in the conventional art in which it is impossible to disassemble the side shield after it is once assembled. When fixing the side shield at the glass leg, the fixture is inserted into the opening of the side shield and is rotated using a driver, so that one portion of the step portion of the fixture is tightly inserted into the through hole of the side shield, and the lower side pressurizes the glasses leg for thereby achieving a stable engagement. Anyone can easily stably assemble or disassemble the side shield using a driver. The side shield can be stably fixed at the glasses leg. The side shield is not escaped from the glasses or is not loosened after a long time use or a movement of the glasses.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a structure for fixing a side shield of glasses in which a side shield 2 is installed at a glasses leg 3, a through hole 22 is formed at the inner upper and lower portions of a rear side of the side shield 2 which surrounds the glasses leg 3, and a fixture 1 is inserted into an opening 21 of the side shield 2, and the both ends of the fixture 1 are inserted into the through hole 22 of the side shield 2, and a pressing member 102 provided at a center portion of the fixture 1 pressurizes the glasses leg 3, an improved structure for fixing a side shield of glasses characterized in that the fixture 1 has a step portion 11 protruded from a lower side end by a certain length with the fixture 1 being inserted into the through hole 22 of both sides through the opening 21 of the side shield 2, and a curvature portion 12 is formed at an upper side of the step portion 11, and the step portion 11 of the fixture 1 is tightly inserted into the through hole 22 of the side shield 2, and a straight line shaped or cross shaped driver insertion groove 13 is formed at an upper surface of the fixture 1.

2. The structure of claim 1, wherein a protrusion 14 having a certain size is formed at a center portion of a lower side of the fixture 1, and a groove 31 is formed at the same height portion as the glasses leg 3 so that the protrusion 14 of the fixture 1 is mounted at the groove 31 with the protrusion 14 of the fixture 1 being closely contacted with the glasses leg 3.

* * * * *